Leon V. Foster
INVENTOR

Patented Nov. 24, 1931

1,833,075

UNITED STATES PATENT OFFICE

LEON V. FOSTER, OF IRONDEQUOIT, NEW YORK, ASSIGNOR TO BAUSCH & LOMB OPTICAL COMPANY, OF ROCHESTER, NEW YORK, A CORPORATION OF NEW YORK

SOUND REPRODUCING APPARATUS

Application filed August 6, 1929. Serial No. 383,878.

This invention relates to the art of reproducing sounds which have been photographically recorded on film. In one method of reproducing sound from a photographic record, a suitable light source illuminates a very narrow slit and the image of this illuminated slit is projected onto the sound record on the film. Varying densities or areas of the sound record on the moving film cause varying amounts of light to fall upon a light-sensitive cell so that current variations are set up in the circuit, of which the cell is a part, and by suitable apparatus are translated into sound, all as is well known in the art.

In reproducing sound in this manner, it is essential, for the true and accurate production of sound, that a very sharp, bright, narrow image of the illuminated slit be projected onto the sound record on the film. In the prior practice, the image of a straight, linear slit has been projected onto the sound record. Due to the curvature of field introduced by the lens system, however, the projected image which falls on the sound record is relatively sharp and clear at its middle portion but is indistinct and fuzzy at the two end portions. This causes a loss of tone quality and poor sound reproduction.

One of the objects of the present invention is to provide an improved means for reproducing sound from a photographic sound record. Another object is to provide sound reproducing means which embodies an improved slit unit whereby a uniformly sharp, clear image of the illuminated slit will be projected onto the sound record on the film. These and other objects and advantages reside in certain novel features of construction, arrangement and combination of parts as will hereinafter be more fully explained and pointed out in the appended claims.

Referring to the drawings.

Figure 1:
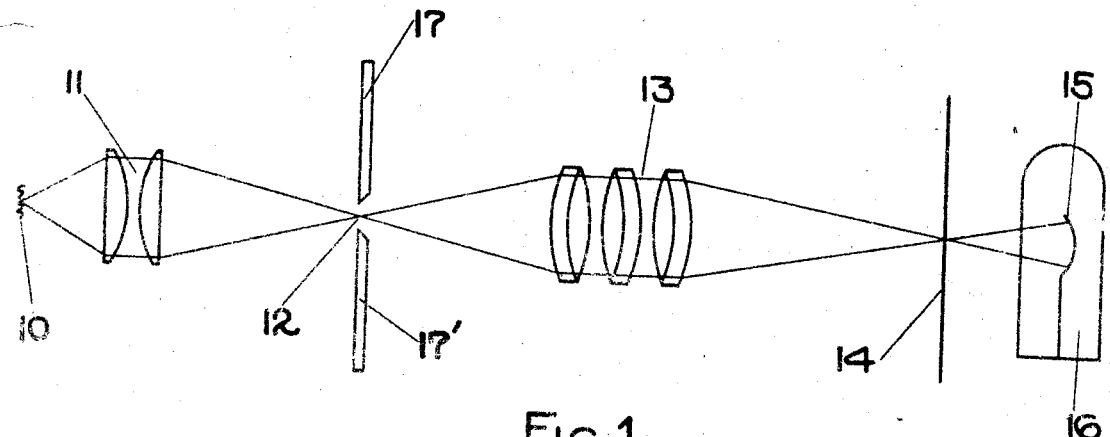
Fig. 1 is a diagrammatic view showing a side elevation of a system embodying my invention.

One embodiment of my invention is illustrated in the drawings wherein a suitable light source 10, such as an incandescent ribbon filament, is imaged by the condensing lens unit 11 in my improved slit, indicated generally at 12. By means of the objective lens system 13, a reduced image of the illuminated slit is projected onto the sound record track on the film 14. As the film 14 is moved, the opaque and transparent portions of the sound record produce a variation in the intensity of light that passes through to the electrode 15 of the light-sensitive cell 16. These variations, in intensity, of the light falling on the electrode of the light-sensitive cell, produce corresponding variations in an electrical circuit which are amplified and translated into sound by methods well known to those skilled in the art.

Figure 2:
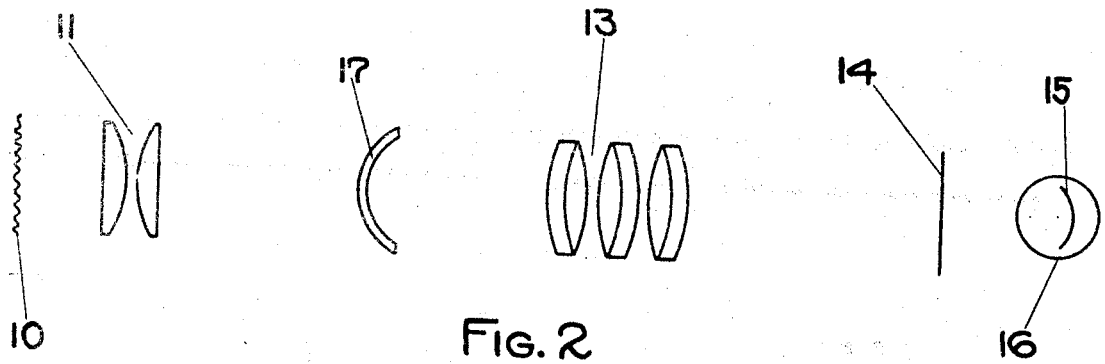
Fig. 2 is a diagrammatic view showing a top plan view of the system.

My improved slit unit, indicated generally at 12, comprises two spaced opaque members 17 and 17' which are curved as shown in Fig. 2 with the concave side of the slit facing the objective lens 13. Although the slit is shown on the drawings in exaggerated size for sake of clearness, in one embodiment which has been reduced to practice, the two members 17 and 17' are spaced 0.0015 inch apart and the curvature of the slit is defined by an arc of a circle whose radius is 6.66 millimeters. It is to be understood, of course, that the slit may be made in other dimensions and formed of any suitable material by any desired method. Thus, for example, the slit could be made by depositing an opaque layer, such as copper or silver, on the surface of a glass cylinder and then making a fine scratch or ruling in the opaque layer to provide a narrow slit. The ruling would, of course, be made around the circumference of the cylinder in a plane perpendicular to the axis of the cylinder.

As hereinbefore stated, the reproducing systems of the prior art use a straight linear slit with the result that the tone quality is poor and the reproduction generally inferior. This is due to the fact that the projecting lens system introduces curvature of field so that the slit image which is projected onto the flat film surface is relatively sharp and distinct at its central portion but is flared out and becomes indistinct and blurred at the end portions. When an image of this type is projected onto the sound record on the film, the flared out portions at the ends of the image cover several small elemental units of the sound record, whereas the sharp, uniform, central portion of the image covers only one elemental unit of the sound record. Hence, such an image will cause the simultaneous reproduction of sounds from different elemental units of sound record, with the result that the tone quality and reproduction will not be true and accurate. If an attempt is made to correct the lens 13 for curvature of field, the working aperture of the lens is greatly reduced so as to impair the successful and efficient operation of the reproducing system.

By means of my improved slit unit, however, I am able to project, onto the sound track on the film, an image of the slit which will be uniformly clear, sharp and distinct throughout its entire length, while still retaining the maximum working aperture of the optical system, so that superior sound reproduction and tone quality are obtained.

Various modifications can obviously be made without departing from the spirit of my invention as pointed out in the appended claims.

I claim:

1. Apparatus for reproducing sound comprising a light source, a light-sensitive cell, means defining an arcuate slit positioned between said source and said cell with the convex side of said slit facing said source and a film positioned between said slit and said cell, said film bearing a sound record.

2. Apparatus for reproducing sound from a photographic sound record comprising a light source, opaque means defining an arcuate slit, a condenser for imaging said source in said slit, a light-sensitive cell, and a lens system for projecting an image of said slit onto the sound record which is positioned between said system and said cell.

3. Apparatus for reproducing sound comprising in combination means defining a curved slit, a light source for illuminating said slit with the convex side of said slit facing said source, a lens system for projecting an image of said slit onto the sound record on a film and a light-sensitive cell in position to receive light rays which pass through a sound record.

4. Apparatus for reproducing sound comprising spaced, opaque, arcuately curved members defining a curved slit, a light source for illuminating said slit, a light-sensitive cell, a sound record positioned between said slit and said cell and lens means for projecting an image of said slit onto said sound record, the concave side of said slit being faced towards said lens means.

LEON V. FOSTER.